United States Patent [19]

Newman et al.

[11] Patent Number: 5,847,024

[45] Date of Patent: Dec. 8, 1998

[54] ANTI-COUNTERFEITING NON-YELLOWING WATERMARK INK

[75] Inventors: Stan Newman, Old Bridge, N.J.; Paul W Hofecker, Johnstown, Pa.

[73] Assignee: Sun Chemical Corporation, Fort Lee, N.J.

[21] Appl. No.: 638,443

[22] Filed: Apr. 26, 1996

[51] Int. Cl.⁶ .............................. C09D 5/00; C08K 5/16; C08K 5/09

[52] U.S. Cl. .......................... 523/161; 524/205; 524/299; 524/599

[58] Field of Search ............................ 523/161; 524/205, 524/299, 599

[56] References Cited

U.S. PATENT DOCUMENTS

| | | | |
|---|---|---|---|
| 5,500,040 | 3/1996 | Fujinami | 106/21 A |
| 5,605,750 | 2/1997 | Romano et al. | 428/304.4 |

*Primary Examiner*—Kriellion S. Morgan
*Attorney, Agent, or Firm*—Sidney Persley

[57] ABSTRACT

A stable, pigmentless, simulated watermark ink is composed of a drying oil modified polyester, an aluminum alkoxide gelling agent and an ultraviolet light absorber.

12 Claims, No Drawings

ANTI-COUNTERFEITING NON-YELLOWING WATERMARK INK

BACKGROUND OF THE INVENTION

The simulation of a watermark on paper and other substrates by means of an ink is known. Such inks can be applied during the printing process using various printing approaches such as wet or dry lithography, and rotary web or letter press printing or by numbering machines. Unfortunately, simulated watermark inks tend to yellow or "age" in a relatively short time. The yellowing tendency of the ink severely detracts from the usefulness of the ink.

The application of an indicator for the purpose of revealing the fact of copying is also known. A material is applied to paper, for example, in security printing, which is either invisible or poorly visible under normal circumstances. However, when exposed to an appropriate light source, such as the light source of a xerographic copying machine, the indicator becomes highly visible. For instance, the word "void" can be printed on the paper in such a way that it is either not visible or visible although not apparent when the paper is exposed to ambient light but which becomes dark and prominent when exposed to an ultraviolet light.

It is the object of this invention to provide a stable, pigmentless, simulated watermark ink which is non-yellowing and will not dry out and which also can be used to make documents printed with the ink more difficult to forge or counterfeit. This and other objects of the invention will become apparent to those of ordinary skill in this art from the following detailed description.

SUMMARY OF THE INVENTION

This invention relates to an anti-counterfeiting, non-yellowing, simulated watermark ink. More particularly, a stable, pigmentless, simulated watermark ink comprises a drying oil modified polyester, an aluminum alkoxide complexing agent and an ultraviolet absorber.

DESCRIPTION OF THE INVENTION

The present invention provides a simulated watermark ink which can be applied to uncoated paper and other substrates during the printing process using wet or dry lithography, or rotary web or letterpress printing or numbering machines. The ink can be used for preparing such materials as corporate letterheads or, alternatively, for novelty printing purposes. When employed in the field of security printing, it makes printed copies difficult to forge or counterfeit and easier to distinguish between genuine printed materials and falsified copies. The ink penetrates through most uncoated paper stocks and remains visible indefinitely. When the printed paper is held up to the light, the visibility of the ink is increased and the watermark can be readily discerned. Also, the ink responds differently to ultraviolet light. For instance, when a printing plate having the word "void" at one or more places of the image area is used to convey the watermark ink of the present invention to the paper, the printed word "void" becomes prominent when copies are made by exposing the inked paper to a copying machine.

The simulated watermark ink of the present invention is a combination of a drying oil modified polyester, an aluminum alkoxide chemical complexing agent gellant and an ultraviolet absorber. Other standard ink additives can be employed as long as they do not adversely affect the stability and non-yellowing characteristics of the simulated watermark ink.

The stable, pigmentless, simulated watermark ink of the present invention is primarily composed of a drying oil modified polyester. Suitable alkyd resins are formed by the condensation of one or more polybasic acids such as phthalic acid, terephthalic acid, isophthalic acid, and the like with a polyhydric alcohol such as ethylene glycol, diethylene glycol, polypropylene glycol, neopental glycol, butanetriol, pentaerythritol, glycerol, trimethylolpropane, mannitol, and the like and modified with a drying oil such as linseed oil, soybean oil, tung oil and the like oils. Most preferably, the drying oil modified alkyd is a linseed oil modified isophthalic acid based alkyd. Commercially available modified alkyd resins included those sold by Iovite Chemicals, Inc. under the trademark IOVITE and those sold by Lawter Chemicals under the trademark TERLON in a variety of viscosities from about 5 to 500 poise. Any of such commercially available materials can be employed. Preferably, the alkyd has a viscosity in the range of about 40 to 75 poise, and most preferably about 47 to 51 poise. The alkyd generally comprises about 85%–97% of the ink and preferably about 90%–92.5%.

To the alkyd is added a gelling effective amount of an aluminum alkoxide chemical complexing agent. Each alkoxide moiety in the agent generally contains about 1 to about 4 carbon atoms. Aluminum tri-isopropoxide is particularly suitable. This is commercially available as a 50% solvent solution in hydrotreated light paraffin oil. If desired, the gellant can be added either as such a purchased product or a solvent solution can be prepared with any solvent for the gellant which does not adversely affect the stability or non-yellowing characteristics of the ink. The gellant will generally be about 2 to 5 weight percent of the ink and is preferably about 2% to 4% of the ink. Accordingly, when the commercially available 50% solvent solutions are used, the solution will constitute about 2% to 10%, preferably about 4% to 8%, of the ink. The amount of gellant is selected so that the rheological properties (for example viscosity, flow, adhesion and tack) will be appropriate to the printing method for which the ink is intended. Other known ink gelling agents such as aluminum stearate or clay gellants do not permit the watermark ink to be stable and non-yellowing and/or result in the ink misting during its application to the paper or other substrate.

The final necessary ingredient in the stable, pigmentless, simulated watermark ink of the present invention is an ultraviolet absorbing effective amount of an ultraviolet absorbing agent. The amount of this agent is generally about 0.1 to 3 weight percent of the ink, and preferably about 0.25 to 0.75 weight percent. The amount can be adjusted depending on the desired visibility of the ink image in response to the ultraviolet light source. The nature of the absorber is not restricted and any known ultraviolet absorber can be employed as long as it is compatible with the other ingredients in the ink. Suitable absorbers include benzophenones such as benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4-methoxybenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone, 2-hydroxy-4-(2-hydroxy-3-methylacryloxy)propoxy-benzophenone and the like; benzotriazoles such as 2-(2'-hydroxy-5'-methylphenyl) benzotriazole, 2-(2-hydroxy-3,5-di(1,1- dimethylbenzylphenyl)-2H-benzotriazole, 2-(2'-hydroxy-3', 5'-di-tertiary-butylphenyl)benzotriazole, 2-(2'-hydroxy-3'-tertiary-butyl-5'-methylphenyl)benzotriazole, 2-(3,5-di-tertiary-amyl-2-hydroxyphenyl)benzotraizole, 2-(2'-hydroxy-3',5'-di-tertiary-butylphenyl)5-chlorobenzotriazole, 2-(2'-hydroxy-3',5'-di-tert-isoamylphenyl)benzotriazole, 2-(hydroxy-5-tertiary-butylphenyl)benzotriazole and the like; salicylic acid esters such as phenyl salicylate, 4-tertiary-butylphenyl salicylate, p-octyphenyl salicylate and the like; diphenyl acrylates such as ethyl-2-cyano-3,3'-diphenylacrylate, 2-ethylhexyl-2-cyano-3,3'-diphenylacrylate and the like; hydroxy-5-methoxyacetophenone; 2-hydroxynaphthophenone; 2-ethoxyethyl-p-methoxycinnamate; nickel bisoctylphenyl-sulfide; [2,2'-thiobis(4-t-octylphenolate]n-butylamine-nickel; oxalic acid anilide, and the like.

The quantities of the gelling agent and ultraviolet absorber relative to the drying oil modified alkyd are adjusted so that the simulated watermark ink has rheological properties appropriate to the printing process by which the ink is going to be applied. As a general proportion, the inks have a viscosity of at least about 125 poise when measured at 25° C. and preferably at least about 150 poise at 25° C. The inks also have a yield value which is generally less than about 2500, preferably less than about 2000, dynes/cm$^2$ as measured on a Laray viscometer.

In order to further illustrate the invention, several examples are set forth below. In these examples, as throughout the balance of this specification and claims, all parts and percentages are by weight and all temperatures are in degrees centigrade unless otherwise indicated.

EXAMPLE 1

To a charge of 91.5 parts of a linseed oil modified isophthalic acid alkyd resin, 0.5 parts of 2-ethylhexyl-2-cyano-3,3-diphenylacrylate were added and dispersed. While mixing was continued, 7 parts of a 50% solution of trioxyaluminum tri-isopropoxide in hydro-treated light paraffinic oil were added. The viscosity was then determined using a Laray viscometer and additional aluminum gellant added as required until the viscosity was 165 poise at 25° C. The yield value of the resulting ink was 1600 dyne/cm$^2$.

The ink was allowed to age for 24 hours and then analyzed again. It was found the viscosity had increased to only 180 poise and the yield value had increased to only 1800 dyne/cm$^2$.

The ink was then allowed to age for an additional period of time of 21 days and analyzed once again. It was found that there was no significant difference in the viscosity or yield values, thereby demonstrating the stability of the ink.

EXAMPLE 2

The ink of Example 1 was applied in a pattern to an uncoated paper by wet lithography printing. The ink penetrated into the paper stock well and the printed image could be discerned albeit not highly prominent when looking at the paper from either side. When the paper was held up to the ambient light, the image pattern became highly visible.

The paper thus produced was placed on a commercial copying machine and multiple copies produced. Each copy contained a highly visible, permanent reproduction of the ink pattern image. The visibility of the ink pattern on the original paper did not change.

EXAMPLE 3

The printed paper of Example 2 was also stored for 210 days under ambient conditions and then examined. No evidence of yellowing was apparent.

EXAMPLE 4

The preparation of the ink of Example 1 is repeated substituting dihydroxybenzophenone for the acrylate ultraviolet absorber.

EXAMPLE 5

Example 1 is repeated employing 92.5 parts of the alkyd resin, 0.6 parts of the ultraviolet absorber and 6.4 parts of the aluminum gellant.

EXAMPLE 6

Example 5 is repeated substituting phenylsalicylate for the acrylate ultraviolet absorber.

Various changes and modifications can be made in the ink of the present invention without departing from the spirit and scope thereof. The various embodiments which were disclosed herein were for the purpose of further illustrating the invention but were not intended to limit it.

What is claimed is:

1. A stable, pigmentless, simulated watermark ink consisting essentially of a drying oil modified polyester resin and a gelling effective amount of an aluminum alkoxide chemical complexing agent and an ultraviolet light absorbing effective amount of an ultraviolet light absorbing agent.

2. The stable, pigmentless, simulated watermark ink of claim 1 comprising about 85% to 97% of drying oil modified alkyd, about 1% to 5% of aluminum alkoxide chemical complexing agent and about 0.1% to 3% of ultraviolet absorbing agent.

3. The stable, pigmentless, simulated watermark ink of claim 2 in which the alkyd is a linseed oil modified alkyd and the aluminum alkoxide is an aluminum isopropoxide.

4. The stable, pigmentless, simulated watermark ink of claim 2 in which the alkyd is about 90 to 92.5 weight percent, the aluminum complexing agent is about 2 to 4 weight percent and the ultraviolet absorbing agent is about 0.25 to 0.75 weight percent.

5. The stable, pigmentless, simulated watermark ink of claim 4 in which the aluminum alkoxide is trioxyaluminum tri-isopropoxide and the ultraviolet absorber is a diphenacrylate.

6. A stable, pigmentless, simulated watermark ink comprising about 85 to 97 weight percent of a linseed oil modified isophthalic acid alkyd, about 1 to 5 weight percent of trioxyaluminum tri-isopropoxide and about 0.1 to 3 weight percent of a diphenylacrylate ultraviolet absorber, and having a viscosity of at least 125 poise at 25° C. and a yield value of less than 25 dynes/cm$^2$.

7. The stable, pigmentless, simulated watermark ink of claim 6 containing about 90% to 92.5% of the alkyd, and about 2% to 4% of the aluminum completing agent, about 0.25 to 0.75 weight percent of 2-ethylhexyl-2-cyano-3,3-diphenylacrylate ultraviolet absorbing agent and having a viscosity of at least about 150 poise at 25° C. and a yield value of less than 2000 dynes/cm$^2$.

8. The stable, pigmentless, simulated watermark ink of claim 7 further containing about 1 to 5 weight percent of an aluminum chemical complexing agent solvent.

9. A substrate printed with the ink of claim 8.
10. A substrate printed with the ink of claim 7.
11. A substrate printed with the ink of claim 6.
12. A substrate printed with the ink of claim 1.

* * * * *